Patented Feb. 24, 1953

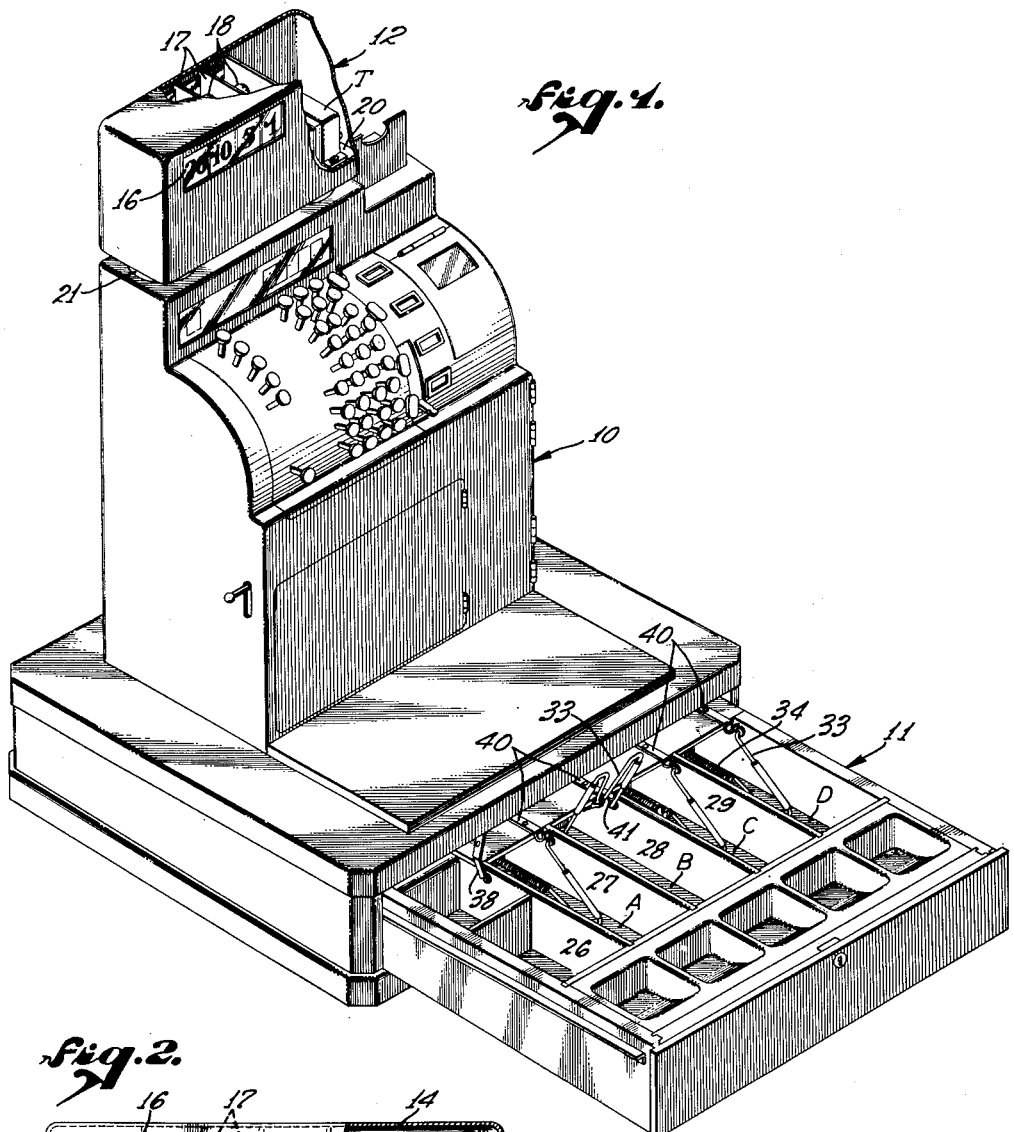
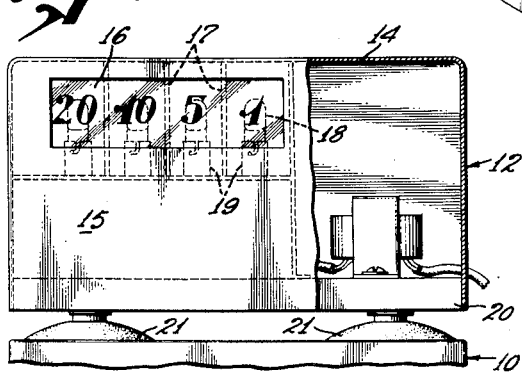

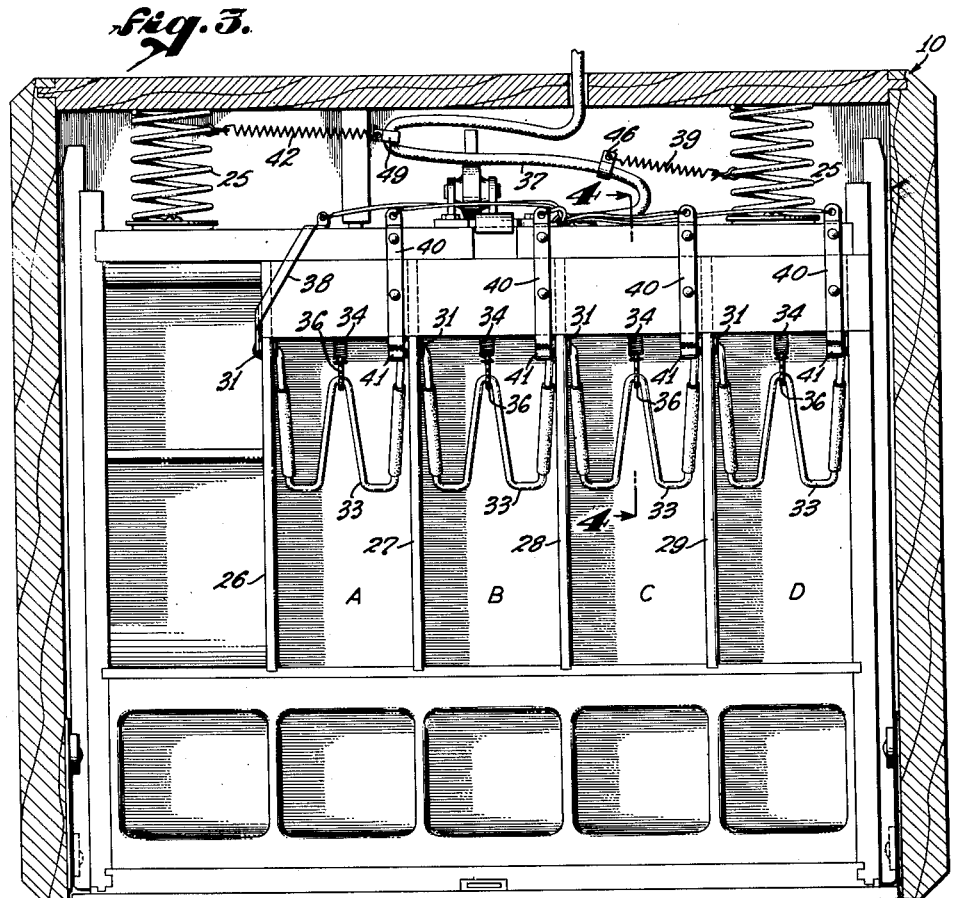
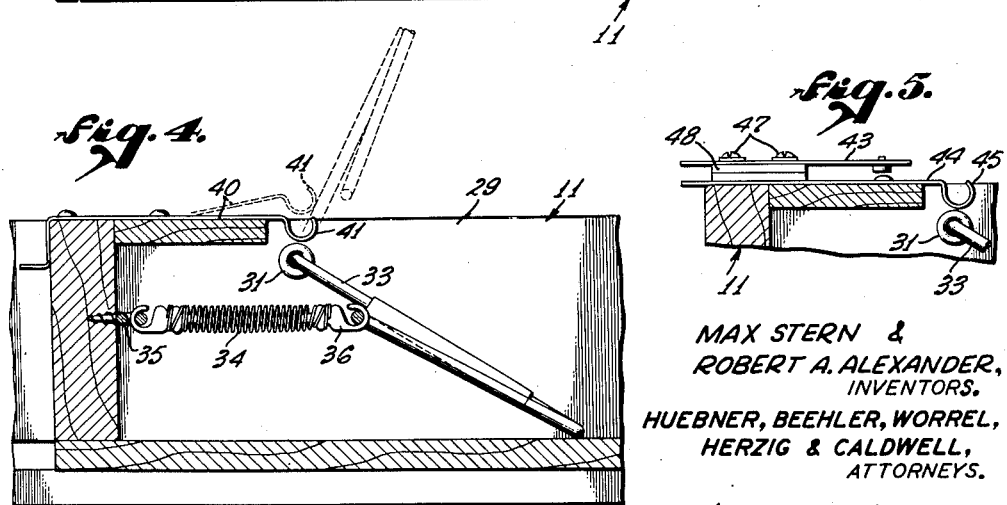
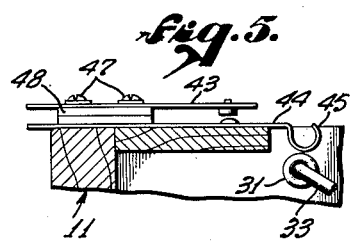

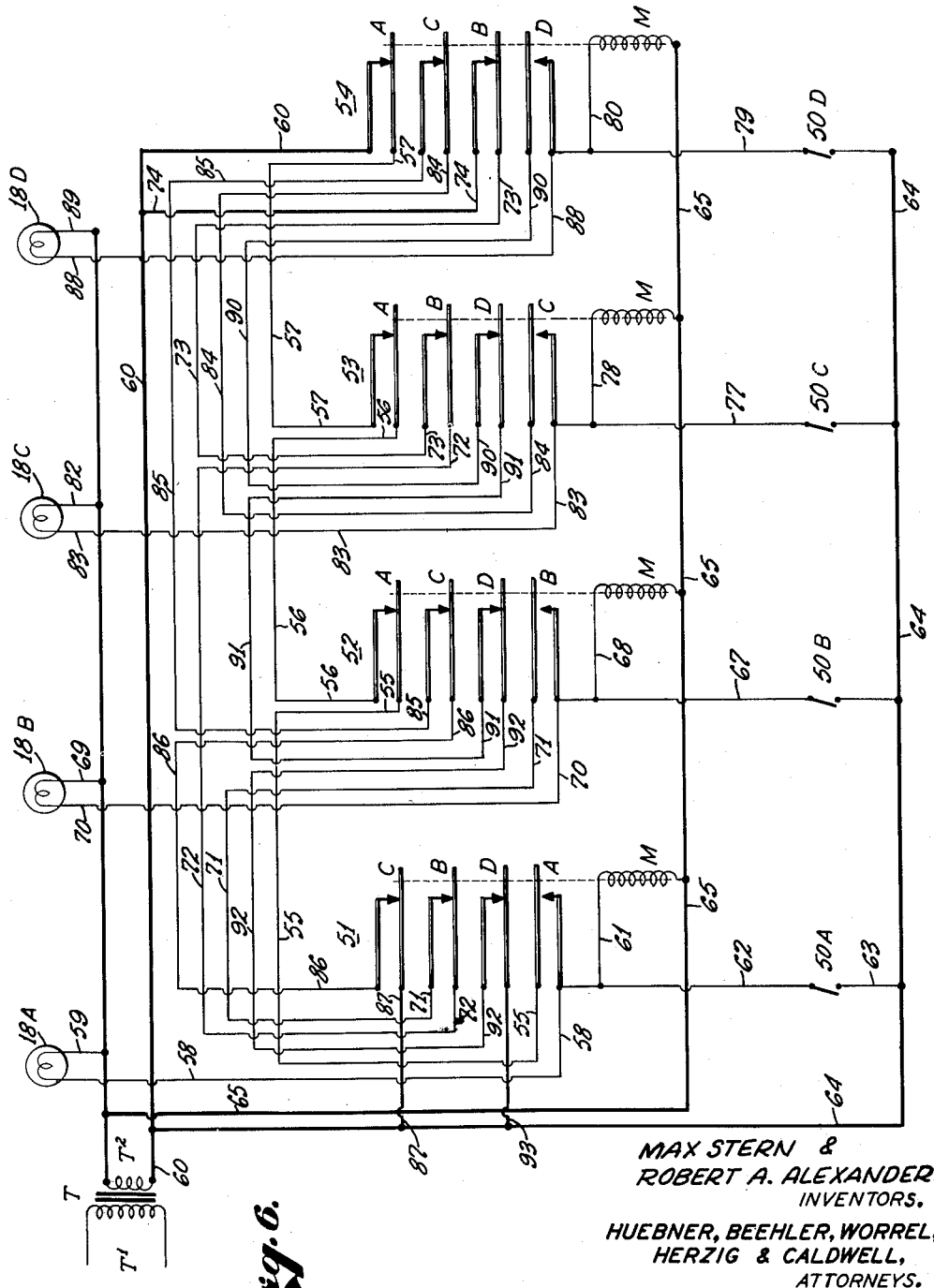

2,629,863

UNITED STATES PATENT OFFICE 2,629,863

CASH REGISTER INDICATING SYSTEM

Max Stern, Venice, and Robert A. Alexander, Rosemead, Calif., assignors to Tel-All Corporation, Los Angeles, Calif., a corporation of California Application May 20, 1949, Serial No. 94,322

4 Claims. (Cl. 340—274)

Our invention relates to an electrical control circuit and has particular reference to an electrical relay circuit used in combination with a standard cash register adapted to indicate the particular bin in the money drawer into which the last bill has been placed.

In most commercial establishments, such as chain stores or large department stores, where relatively large numbers of customers are handled and, consequently, large quantities or large amounts of cash are received during the course of business, the problem of changing money or receiving payment in large denomination currency is serious in that unless some method of identification is adapted to indicate the size currency or bill denomination handed the cashier, arguments frequently arise.

When a bill is received by a cashier, if it is put in one of the bins in the cash register drawer and then change made, the customer may claim that he has tendered a larger bill than was actually received. Such arguments are harmful to good will. In order to avoid such arguments, it has become the custom of most cashiers to place the bill on top of the cash register until change has been made and then place it in the cash drawer with an attendant loss of time in such duplication of movements.

It has also been found that quite frequently unscrupulous persons will tender small bills, such as a one dollar bill, receive their change, and then claim that they had tendered a ten dollar bill. Unless some method of identification has been used, it is frequently the result that the store will pay the customer rather than delay all subsequent customers while cash is counted and checked against the cash register tape.

One of the objects of our invention is to provide and indicating means controlled by an electrical circuit that automatically and instantaneously indicates which bin received the last bill.

Most cash register drawers are formed with a spring loaded currency retaining bracket in each bin, which must be lifted out of place in order to place money in the respective bin.

It is also among the objects of our invention to provide an electrical circuit which instantaneously and automatically indicates which currency retainer was last raised, thereby clearly indicating into which bin the bill was placed.

With such an indicator if the indicator reads, fro example, one dollar, it is therefore clear that the currency retainer of the one dollar bin was the last retainer lifted and that in the event of an argument, only the one dollar bin need be checked. If the top bill is for one dollar, there has been no error.

In the event that a customer gives the cashier, for example, a ten dollar bill, and the ten dollar bill is placed in the proper bin, and the cashier makes change for only a one dollar bill, the indicator will instantly tell both the customer and the cashier that a ten dollar bill was placed in the machine and that the proper change should, therefore, be made.

It will thus be seen that a further object of our invention is to provide a means for accurately determining what size bill and where said bill was placed in each cash register drawer to avoid or eliminate confusion or mistake.

Other and further objects and advantages of our invention will become apparent from the drawings and the specifications relative thereto.

In the drawings:

Figure 1 is a perspective view of a standard cash register shown in combination with a fragmentary view of our indicator.

Figure 2 is a partial sectional elevation of the indicator.

Figure 3 is a top plan view of a standard cash register drawer showing the switching elements to be used in connection with our invention.

Figure 4 is a sectional view taken on line 4—4 of Figure 3.

Figure 5 illustrates a modified form of switch.

Figure 6 is a schematic electrical wiring diagram.

In Figure 1, we have illustrated a standard cash register, designated generally 10, having a drawer 11, and an indicator, designated generally 12. The details of both the drawer 11 and the indicator 12 will be explained more fully in connection with other figures of the drawings.

Indicator

As illustrated in Figure 2, which shows one of the preferred forms, the indicator comprises a housing 14 having a front 15, the front 15 being formed with a transparent window 16. A plurality of partitions 17 are disposed transversely in the housing to divide the transparent window 16 into segments. Each of the segments carries some indicating label, such as one, five, ten and twenty. An indicating means, such as an incandescent lamp 18 supported in a socket 19, is positioned immediately behind the transparent window 16 in each of the segments defined by the partitions 17.

The housing also includes a base 20 having means for retaining the housing on the top of the cash register, such as suction cups 21.

Cash drawer

The cash drawer 11 is adapted to slidably fit into the cash register 10 and is urged outwardly therefrom by a pair of compression springs 25. When the tabulating keys of the cash register are operated, the cash drawer is released and the springs 25 urge the drawer outwardly.

The cash drawer is formed with a plurality of partitions 26, 27, 28 and 29, dividing the drawer into currency-receiving bins A, B, C and D adapted to contain various denominations of currency.

Each of the partitions, such as 29 in Figure 4, is formed with a metal bushing 31 adapted to serve as a pivot point for the currency retainer.

The currency retainer is a substantially W-shaped bracket 33 having outwardly depending legs which are received by the bushings 31. A tension spring 34 is secured to the back of the cash register drawer by means of a screw eye 35, and to the currency retainer by means of a hook 36, as indicated in Figures 3 and 4.

In view of the fact that the screw eye 35 is at a point below the pivot point or bushing 31, it is clear that as soon as the currency-retaining bracket is rotated downwardly to a point slightly below horizontal, the spring 34 will urge rotation of the bracket in a clockwise direction, and that when the currency-retaining bracket 33 has been lifted to a point above the center line between the screw eye and the pivot point of the bushing 31, the retaining bracket will be urged in a counter-clockwise direction.

An electrical bus or connection 38 is electrically connected to the bushing in the partition 26. In view of the fact that the currency-retaining bracket 33 and the bushings 31 are usually formed of metal, the bus 38 is electrically connected to all of the currency-retaining brackets. A switch member 40 is secured to the top of the drawer and has a contact segment 41 adapted to contact a portion of the currency-retaining bracket when the bracket is raised as is indicated in phantom in Figure 4. Therefore, upon raising the bracket 33 an electrical circuit is completed between the bus 38 and the switch 40.

A modified form of switch is illustrated in Figure 5 wherein both electrical contacts are independent of the material from which the bushings 31 have been made or the electrical conductivity or continuity between all of the brackets. In the modification illustrated in Figure 5, the bus 38 has been replaced by a switch contact 43. A switch contact 44 having an operating depending cam member 45 is positioned on the cash register drawer adjacent each bin, so that raising the respective retaining member 33 will contact the segment 45 urging the switching contact 44 upwardly into electrical contact with the switching contact 43. The switching contacts 43 and 44 are secured to the cash register drawer 10 by means of screws 47 and are electrically separated by means of insulating blocks 48.

A multiple conductor cable 37 is electrically connected to the bus 38 and each of the switches 40 and extends through the housing of the cash register 10. Sufficient cable is provided to permit reaching the drawer 11 while in its extended position. Tension springs 39 and 42 are connected to the cable by clips 46 and 49 so that when the drawer 11 is pushed into the cash register 10, the cable 37 will fold into an S-shape so that it will not become wedged under the drawer 10 or otherwise be damaged or cause damage to the cash register.

In either event, it is clear that upon raising the retaining member 33, an electrical contact is made which can be used for operating an indicating device.

*Electrical circuit*

The indicator means, designated 18 in Figure 2, are designated 18A–18D, inclusive, and are intended to designate the light corresponding to the bins A—D, inclusive, in Figure 3. The switching elements, such as the bus 38 and the member 40 in Figures 3 and 4, or the switching elements 43 and 44 of Figure 5, are represented by the schematic switches 50A–50D, inclusive.

The wiring circuit comprises a source of low voltage potential, such as the transformer T having a primary coil $T^1$ and a secondary coil $T^2$. It is to be understood that the primary coil $T^1$ is connected with the standard domestic source of electrical current, such as 110 volts, but that the system is designed to operate on 6 or 12 volts to avoid any possibility of shocking the operator by touching the currency-retaining bracket 33.

The diagram illustrates an indicator for a four-bin cash register drawer, that is, a cash register drawer adapted to receive one, five, ten and twenty dollar bills. It will, of course, be apparent from a further detailed description of the control circuit that any number of bins can be used by a proper modification of the control circuit. Such modification will readily be apparent to those skilled in the art.

An electrical relay, such as 51, 52, 53 and 54, is provided for each indicator light and each cash bin in the cash register drawer. Each of the relays comprises an electric magnet, designated M, and four contact points, designated A, B, C and D. It will be understood that a reference to contact points, such as 51B or 52B, refers to the respective contact points of the respective relay numbered 51 or 52.

The contact points A of each respective relay are connected in series by means of conductors 55, 56 and 57, and are connected in series with the transformer secondary coil $T^2$ by means of conductor 58, light globe 18A, conductor 59 and conductor 60.

Contact points 51A, 52B, 53C and 5D4 are normally open, whereas, all other contacts in each individual relay are normally closed.

Coil 51M is connected to the transformer secondary coil $T^2$ by means of the circuit conductors 61 and 62, switch 50A, conductors 63, 64 and 65. It will, therefore, readily be seen that upon closing the contact 50A, the coil M is energized and the relay activated to close the contact points A and to open the contact points B, C and D in the relay 51.

Upon closing the contact point 51A, a circuit is completed from the transformer secondary $T^2$ through conductor 59, light globe 18A, conductor 58, contact point 51A, conductors 55, 56, 57 and 60 through the respective contact points 52A, 53A and 54A.

A circuit is also created through the conductor 65, magnetic coil 51M, conductor 61, contact points 51A, conductors 55, 56, 57 and 60 through the contact points 52A, 53A and 54A, so that once the solenoid 51 is energized to energize the light 18A, a holding circuit is created which maintains the circuit and keeps the light 18A on until one of the contact points 52A, 53A and 54A is broken by the action of one of the other relays.

Upon closing the switch 50B by raising the currency retainer in bin B, a circuit is created through the conductor 64, switch 50B, conductors 67 and 68, magnetic coil 52M and conductor 65 back to the conductor 65, thereby energizing the coil 50M and closing the contact at the point 52B and breaking the contacts 52A, 52C and 52D. By breaking the contact 52A, the light 18A and the magnetic coil 51M are both de-energized.

Upon closing the contact 52B, a circuit is created through conductor 69, light globe 18B, conductor 70, contact point 52B, conductors 71, 72, 73, 74 and 60, through contact points 51B, 53B and 54B.

Upon closing the contact point 52B, a holding circuit is also created through conductor 65, magnetic coil 52M, conductor 68, contact points 52B, conductors 71, 72, 73, 74 and 60, through the switch contacts 51B, 53B and 54B.

The magnetic coils 53M and 54M are similarly energized by means of switch contacts 50C and 50D, respectively, by means of conductors 77 and 78, and 79 and 80, so that closing either the switch 50C or 50D will energize the respective magnetic coil and close the respective contacts 53C or 54D, and open the contacts 53A, 53B and 53D, or 54A, 54C and 54B.

Similarly, upon closing either of the respective contact points, series circuits as follows are created: Upon closing contact 53C, a circuit to conductor 82, light globe 18C, conductor 83, switch contact 53C, conductors 84, 85, 86 and 87 through the respective contacts 54C, 52C and 51C, is established.

Simultaneously, respective holding circuits are created from the main lead 65 through magnetic coil 53M, conductor 78, contact point 53C, conductors 84, 85, 86 and 87, through contact points 54C, 52C and 51C.

The light globe 18D is controlled by the solenoid 54, and upon closing the contact point 50D, a circuit is created through conductors 64 and 79, contact point 54D, conductor 88, light globe 18D and conductor 89. The holding circuit to maintain the indicator light 18D energized comprises conductor 65, magnetic coil 54M, conductor 80, contact point 54D, conductors 90, 91, 92 and 93 and contact points 53D, 52D and 51D.

It is, therefore, clear that upon closing any of the respective contact points 50A, 50B, 50C or 50D, the respective or corresponding light globe 18A–18D will be energized and all other holding circuits and light globes will be extinguished. The respective light globe will remain energized until one of the other contact points has become closed.

It becomes apparent that raising one of the currency retainers 33 to place a particular denomination bill in one of the bins A, B, C, or D will energize the proper indicator light, which said light will remain energized until one of the currency retainers 33 in one of the other bins has been lifted.

Those skilled in the art will understand that the control and indicator circuit we have illustrated in Figure 6 is not confined to one having four indicator lights and four respective relay circuits. Any number of indicator lights can be used if the solenoid or control relay is modified accordingly. In the event that other or more lights or indicator means are used, an additional contact point must be added to each of the relays, which said contact point will be normally closed and will be placed in series with each of the other contact points controlling the respective indicator light.

What we consider the essence of our invention is an indicator circuit adapted to be used in connection with cash registers having a plurality of indicator lights, a control relay for each of said lights, means in series with each of said control relays for energizing the magnetic coil contained therein, a normally open contact point in each of said relays adapted to energize the respective indicator light and to create a holding circuit through the magnetic coil, and a contact point in each of the other respective relays in series with said holding coil and said indicator light.

While we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent devices.

Having described our invention, what we claim as new and desire to secure by Letters Patent is:

1. In combination, a cash register having a cash drawer, said drawer being divided into a plurality of currency-receiving bins and having a currency-retaining bracket disposed in each of said bins, electrical switching means associated with each of said retaining brackets adapted to be closed upon the lifting of said bracket, an electrically responsive indicator means in circuit with such switching means for indicating lifting of each currency retainer bracket, a plurality of electromagnets having the electric circuit thereof in series with the switching means, each of which is adapted to be energized respectively upon the closing of one of the switching means associated with each currency-receiving bin, each of said electromagnets being associated with at least one magnetically responsive normally open switch and a plurality of magnetically responsive normally closed switches, each of said normally open switches being adapted upon being closed to energize one of said indicator means and to create a holding circuit for said electromagnet in series with one of the normally closed switching means associated with each of said electromagnets.

2. In combination, a cash register having a cash drawer, said drawer being divided into a plurality of currency-receiving bins and having an electrically conductive currency-retaining bracket disposed in each of said bins and being electrically connected to a source of power, electrical contacting means disposed adjacent each of said retaining brackets adapted to contact said bracket upon the lifting of said bracket to complete an electrical circuit therethrough, a plurality of electrically responsive indicator means, one of which is adapted to be energized upon lifting of each currency retainer bracket, a plurality of electromagnets, one of which is adapted to be energized upon lifting of each of said retaining brackets, each of said electromagnets being associated with at least one electrically responsive normally open switch and a plurality of electrically responsive normally closed switches, each of said normally open switches being adapted upon being closed to energize each of said indicator means and to create a holding circuit for said electromagnet, in series with one of the normally closed switching means associated with each of said electromagnets.

3. A cash register currency indicator comprising a cash register having a series of currency receiving bins and a currency retainer bracket in each bin, an electric circuit for each bin, an electric retainer switch for each bracket adapted to be closed by lifting the bracket and a solenoid in the electric circuit in series with the retainer switch, a series of relay switches under the control of each solenoid wherein at least one relay switch is normally open and the remaining relay switches are normally closed, a solenoid holding circuit for each solenoid having said solenoid, said normally open relay switch and an electrically actuated indicator in series therein, each normally open relay switch being in a series circuit with a normally closed relay switch in each of the other series, each of the retainer switches upon closure thereof being adapted to actuate the respective solenoid and cause initiation of operation of the respective indicator and holding circuit and simultaneously cause cessation of operation of all the other indicators and holding circuits.

4. A cash register currency indicator comprising a cash register having a cash drawer divided into a plurality of currency receiving bins, a spring-pressed currency retainer located in each bin and electric retainer switches on the drawer associated one with each bracket adapted to be closed by lifting the bracket when the drawer is open, a bank of relay contact switches for each bin having one open contact switch and a plurality of closed contact switches numbering one less than the number of bins, a source of electric energy, a solenoid circuit connected to the source of energy and solenoid in the circuit in series with the source of electric energy and the respective retainer switch, a holding circuit connected to the source of electric energy, said solenoid being in series in said holding circuit and with the normally open contact switch of the respective bank of relay contact switches, an electrically actuated visible indicator corresponding to each bin in series with each normally open contact switch and with one of the normally closed contact switches of each of the other banks of relay contact switches, each of said retainer switches upon closure thereof by the retainer bracket while the drawer is in open position being adapted to energize the respective solenoid, and energization of said respective solenoid being adapted to energize the holding circuit therefor and the respective indicators and to simultaneously deenergize any other energized solenoids and indicators.

MAX STERN.
ROBERT A. ALEXANDER.

REFERENCES CITED

The following references are of record in the file of this patent:

UNITED STATES PATENTS

| Number | Name | Date |
|---|---|---|
| 1,765,538 | Nelson | June 24, 1930 |
| 1,903,535 | Scott | Apr. 11, 1933 |
| 2,388,733 | Fischler et al. | Nov. 13, 1945 |
| 2,490,807 | Hodel et al. | Dec. 13, 1949 |